Figure 1:
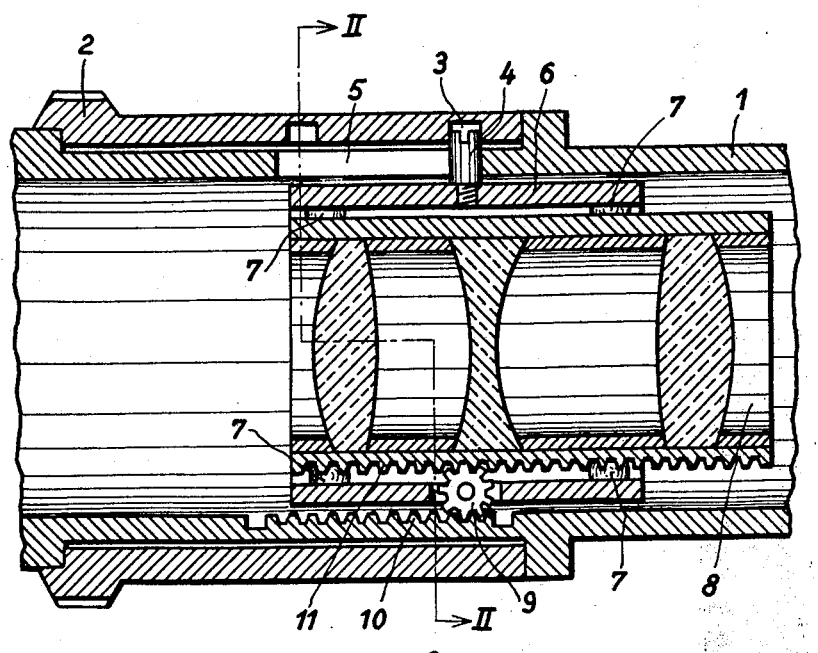

May 7, 1963  O. ERBE ET AL  3,088,370
ADJUSTABLE LENS MOUNT
Filed June 20, 1960

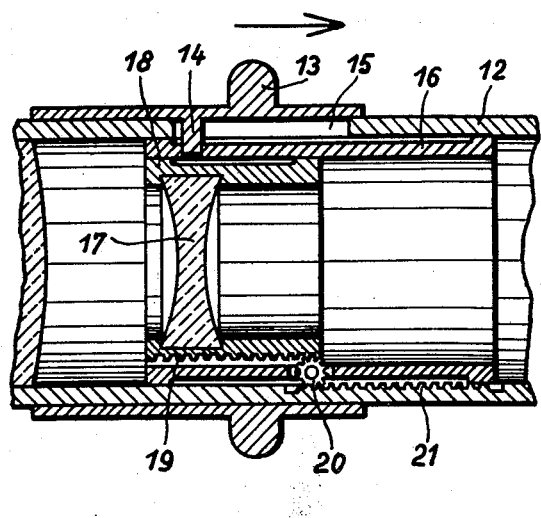

United States Patent Office 3,088,370
Patented May 7, 1963

3,088,370
ADJUSTABLE LENS MOUNT
Otto Erbe, Aalen, and Otto Weiss, Aufhausen, Kreis Aalen, Germany, assignors to Carl Zeiss, Oberkochen, Wurttemberg, Germany
Filed June 20, 1960, Ser. No. 37,234
Claims priority, application Germany July 11, 1959
2 Claims. (Cl. 88—57)

The present invention relates to improvements in objective mounts provided with a device for axial displacement of the optical systems or parts of optical systems arranged within the mounts by means of an operating member provided on said mounts.

It is known to utilize objective mounts for axial displacement of optical systems or parts of optical systems in which an operating member is arranged on the objective mount, said actuating means acting over a thread on optical elements disposed in an adjustable mount. In order to permit relatively large axial displacements, long threads and long cylindrical guides are necessary. The objectives, therefore, had to be made of substantial length. Furthermore, it is rather difficult to manufacture this type of long threads and the cylindrical guides with the necessary precision. When heavy objectives of large diameter are to be used, difficulties arise due to the excessive frictional forces in case of large displacements which make a fine adjustment of the objective very difficult.

In pancratic objectives it is known to use a linkage consisting of several levers for the displacement of parts of optical systems, whereby the linkage is arranged outside of the objective mount. This arrangement has the disadvantage that it is rather complicated and was easily distorted. This linkage also substantially increases the weight of the objective and is very bulky.

When a slidable sleeve is provided on the objective instead of said linkage for displacement of parts of optical systems for focusing, which sleeve is directly coupled with the member to be displaced, then the required cylindrical guidance for the slidable sleeve is in general not suitable for long displacement paths. This arrangement requires a substantial increase of the outer diameter and length of the objective mount.

The present invention eliminates all these disadvantages and provides a number of substantial improvements in objective mounts, particularly in mounts for heavy objectives having a large diameter, and for pancratic objectives.

The objective mount of the invention is provided with a device for axial displacement of optical systems or parts of optical systems and is adjusted by means of an operating member which comprises a gearing arranged between said operating member and the mount for the optical members to be displaced. It is, for instance, advantageous to provide a gearing which will shift the mount of said displaceable member by a double amount of the axial displacement, controlled by the movement of the operating member.

The shortening of the displacement path controlled by said gearing, which is operated by said operating member, produces a substantial advantage. When the operating member has the form of the slidable sleeve, the displacement of the entire photographic objective or of parts of the same can be effected by a movement of the index finger only. The camera can be held in both hands, which is of great importance, particularly in aerial photography.

An advantageous design of said gearing consists of a gear rack which is rigidly connected with the objective mount, and a pinion engaging said gear rack, which pinion is relative to its axial movement firmly connected with said operating member. Furthermore, a second gear rack is rigidly connected to the mount of the member to be displaced, said pinion also engaging said second gear rack. It is advantageous to support said pinion in an intermediate sleeve, which is also firmly connected to the operating member and which is guided in the objective mount.

A conventional cylindrical guide may be used for guiding the intermediate sleeve in the objective mount, and for guiding the mount of the displaceable system in the intermediate sleeve. In case of objectives of large diameter it is, however, more advantageous to provide a ball bearing guide in place of a slideable sleeve. For this purpose the intermediate sleeve is designed in the form of a ball race.

A rotating ring which is not shiftable in axial direction can be used as the operating ring. This ring controls over a spirally-shaped groove the movement of the intermediate sleeve. A threaded ring movable in axial direction and which is provided with an annular groove or a simple shiftable sleeve can also be used. Since the displacement path of a shiftable sleeve or of the threaded ring in the new objective mount, which is necessary for focal adjustment, is very short, the operating member may be designed in such a manner that the same will cover, in any position, the slot in the objective mount through which the follower pin passes between the operating member and the intermediate sleeve.

Figure 2:
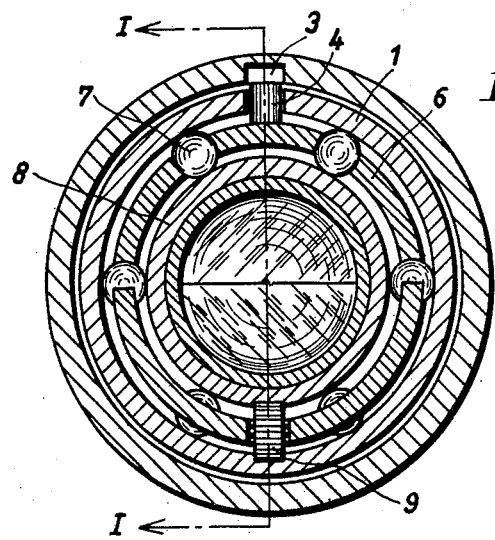

The present invention will now be described with reference to the following embodiments shown in the accompanying drawings, in which:

FIG. 1 shows schematically an objective mount used for axial displacement of an optical system in accordance with the present invention, FIG. 2 shows a cross sectional view along the line II—II of FIG. 1, and FIG. 3 shows a partial sectional view of an objective mount of a pancratic objective which is used for displacement of a part of an optical system according to the present invention.

Referring to FIG. 1, the objective mount 1 has arranged thereon an operating ring 2 in such a manner that the same cannot be displaced in axial direction. The ring 2 is provided with a spiral-shaped groove 3 which is engaged by a radial pin 4 which passes through an axially directed slot 5 provided in the cylindrical wall of the objective mount 1 and is fixedly connected to the intermediate sleeve 6 arranged within the mount 1. The intermediate sleeve 6 is formed as a ball cage and carries two axially spaced rows of balls 7. During the movement of the intermediate sleeve 6 these balls 7 roll along the inner face of the cylindrical wall of the objective mount 1 and also on the outer cylindrical wall of a barrel 8 containing the optical system to be displaced. In order to provide a playfree guidance of the barrel 8, the ball races for the balls may be rolled into the cylindrical walls of the members 1 and 8. A lengthwise extending gear rack 10 is fixedly connected with the objective mount 1. The rack 10 meshes with a pinion 9 which is rotatably supported by the intermediate sleeve 6. The pinion 9 also meshes with another gear rack 11 provided on the outer surface of the barrel 8.

When the operating ring 2 is rotatably adjusted, the intermediate sleeve 6 is displaced in axial direction by the pin 4. The pinion 9 which is supported in said intermediate sleeve 6 rolls along the gear rack 10 and moves the barrel 8 by means of the gear rack 11 a distance twice the distance the intermediate sleeve 6 was moved. This transport movement is a result of the simultaneous translation and rotary movement of the pinion 9.

A threaded ring may be provided in place of the rotatable operating ring 2 which latter is not movable in axial direction. The threaded ring would move in axial direction when rotated. In such a case the spiral groove 3 should be replaced by an annular groove. Such a threaded ring can easily be made sufficiently long so that the same will cover the slot 5 in the objective mount 1 in each position of same. This full covering will prevent any dust or other impurities from entering into the objective mount.

In the embodiment of the invention as shown in FIG. 3 the mount 12 of the pancratic objective has mounted thereon an axially slidable sleeve 13. The slidable sleeve 13 carries a radial pin 14 which passes through an axially directed slot 15 into the objective mount 12 and is fixedly connected with an intermediate sleeve 16. This intermediate sleeve is guided in the objective mount for slidably supporting the barrel 18 of an optical element 17 for focusing the pancratic objective.

A lengthwise extending gear rack 21 is fixedly connected to the objective mount 12. A pinion 20 which meshes with the gear rack 21 is rotatably supported in the intermediate sleeve 16 and also meshes with a second gear rack 19 which is fixedly connected to the barrel 18 carrying the element 17.

When the sleeve 13 is slidably displaced in the direction of the arrow, the intermediate sleeve 16 is moved along by the pin 14. The pinion 20, which is supported by said sleeve, will roll along the gear rack 21 and will move by means of the second gear rack 19 the barrel 18 a distance which is twice the distance the sleeve 16 was moved.

The slidable sleeve 13 is designed in such a manner that the slot 15 in the objective mount 12 is fully covered by same in each position of the mount.

It is obvious that in place of the slidable bearing guide as shown in FIG. 3 the ball bearing guide shown in FIGS. 1 and 2 may be used, particularly when relatively heavy optical systems or parts of optical systems having large diameters are to be slidably adjusted.

What we claim is:

1. In an adjustable lens support, a lens mount, a barrel having a lens system slidably mounted in said mount, a sleeve between said barrel and mount for axial sliding movement, means for preventing rotation of said sleeve, a gear wheel rotatably supported by said sleeve in an opening thereof, a rack on the internal surface of said mount, a rack on the external surface of said barrel, said gear being positioned for drivingly engaging said racks, an operating member on said mount arranged for rotary motion and means drivingly connecting said operating member to said sleeve whereby rotary motion manually applied to said operating member will move said sleeve in an axial direction and adjust said barrel at a rate of speed equal to substantially twice the speed of said sleeve.

2. In an adjustable lens support according to claim 1 in which said intermediate sleeve is provided with a series of anti-friction balls for slidably and anti-frictionally supporting said sleeve in said mount during axial adjustment and displacement.

References Cited in the file of this patent

UNITED STATES PATENTS

| 751,116 | Stark | Feb. 2, 1904 |
| 1,898,905 | Seitz | Feb. 21, 1933 |
| 2,938,444 | Kellner | May 31, 1960 |

OTHER REFERENCES

"A Large Range Variable Magnification Telescope," Back, Journal of the Optical Society of America, vol. 43, No. 12, page 1195, December 1953.